| United States Patent [19] | [11] 3,897,399 |
|---|---|
| Newton | [45] July 29, 1975 |

[54] POLYMERIC COMPOSITIONS

[75] Inventor: Geoffrey Phillip Newton, Luton, England

[73] Assignee: Laporte Industries Limited, London, England

[22] Filed: Jan. 29, 1973

[21] Appl. No.: 327,594

[30] Foreign Application Priority Data

| Feb. 8, 1972 | United Kingdom | 5782/72 |
| Feb. 8, 1972 | United Kingdom | 5783/72 |
| Mar. 11, 1972 | United Kingdom | 11514/72 |
| Mar. 11, 1972 | United Kingdom | 11515/72 |

[52] U.S. Cl.................... 260/77.5 AN; 260/2.5 AN
[51] Int. Cl............................................ C08g 22/12
[58] Field of Search............... 260/2.5 AN, 77.5 AN

[56] References Cited
UNITED STATES PATENTS

| 2,962,455 | 11/1960 | Hostettler | 260/77.5 AN |
| 2,962,524 | 11/1960 | Hostettler | 260/78.3 R |
| 2,977,385 | 3/1961 | Fowler | 260/2.5 AN |
| 2,990,379 | 6/1961 | Young | 260/2.5 AN |
| 3,051,687 | 8/1962 | Young | 260/78.3 R |
| 3,645,986 | 2/1972 | Rifi | 260/77.5 AN |

OTHER PUBLICATIONS

Saunders and Frisch, Polyurethanes, Chemistry and Technology, Vol. I; Interscience; N.Y. 1962; pages 261–273, 337–344.

"Some Unusual Routes to Rigid Polyurethan Foams," C. R. Thomas; Society Chemical Industry (London) Monograph No. 20; pages 285–295; 1966.

Primary Examiner—Melvyn J. Marquis
Assistant Examiner—C. Warren Ivy
Attorney, Agent, or Firm—Larson, Taylor and Hinds

[57] ABSTRACT

A process for the production of a rigid foamed or non-foamed polyurethane which comprises reacting a low molecular weight adduct, formed by reacting a lactone and optionally an epoxide with a polyfunctional initiator having three or more active hydrogen atoms, with a di-isocyanate.

12 Claims, No Drawings

POLYMERIC COMPOSITIONS

The present invention relates to polymers in particular to a process for the preparation of rigid polyurethane.

Rigid polyurethanes, whether foamed or non-foamed which exhibit the properties of high heat distortion temperatures, good impact strength and good flexural modulus are of considerable importance for use in for example, automobile bodies. Hitherto it has generally been found difficult to produce polyurethanes having sufficiently good properties for these purposes.

It is an object of the present invention to provide a new or improved process for the production of rigid polyurethanes.

According to the present invention there is provided a process for the production of a rigid polyurethane which comprises, a. reacting a lactone, as hereinafter defined, with a polyfunctional compound having three or more active hydrogen atoms to produce a low molecular weight, liquid adduct, and b. reacting the adduct with a polyisocyanate.

Where it is desired to produce a rigid polyurethane foam it is necessary to introduce into the reaction between the adduct and the polyisocyanate a blowing agent. The blowing agent may be any known in the art and may particularly be water, a halo-hydrocarbon or a halo-carbon such as a chlorofluorocarbon. A particularly preferred chlorofluorocarbon is trichlorofluoromethane.

The molecular weight of the adduct is controlled, at least in part, by the proportion of lactone to polyfunctional compound. A low proportion of lactone to polyfunctional compounds tends to promote a low molecular weight adduct. Advantageously the adduct has an average weight of less than 750. In the case of a lactone adduct which is not to be foamed the average molecular weight of the adduct is preferably between 200 and 600 in order to obtain particularly desirable combinations of impact strengths and heat distortion temperatures. Where it is desired to produce a foamed polyurethane from the lactone adduct then preferably the average molecular weight is less than 500 and particularly preferably between 250 and 400. In certain circumstances it may be advantageous to introduce an epoxide into the reaction between the lactone and the polyfunctional compound and to form a lactone-epoxide adduct in these circumstances the preferred average molecular weights for the non-foamed and foamed systems are between 200 and 450. In all cases the optimum average molecular weight of the adduct depends on the polyfunctional compound or initiator used.

The adducts are liquids and to encourage the formation of a liquid adduct a mixture of the lactones or a mixture of the polyfunctional compounds may be employed. Where an epoxide is used a mixture of epoxides may be used to encourage the formation of a liquid adduct.

The viscosity of the liquid adducts is advantageously less than 6000 cps at 25°C, and in the case of foamed polyurethanes formed from lactone adducts preferably less than 2500 cps at 25°C. The low viscosity is desirable to obtain rapid and adequate mixing of the adduct to the polyisocyanate which is important in producing a good product.

The lactone ring, and possibly epoxide ring where an epoxide is used, is opened by the active hydrogen atoms of the polyfunctional compound such that an hydroxyl terminated chain attached to the polyfunctional compound is formed in the normal manner. This hydroxyl terminated chain competes with hydroxyl groups or other hydroxyl terminated chains for reaction with further lactone molecules in the same manner. In addition to the polyfunctional compound having three or more active hydrogen atoms there may also be present polyfunctional compounds having two active hydrogen atoms such as diols. Particularly suitable diols are ethylene glycol, diethylene glycol, ethane 1,2 diol, propylene glycol, butane 1,4 diol and hexane diols. The presence of diols helps to reduce the viscosity of the adducts. The amount of polyfunctional compound having two active atoms which may be used increases as the average number of active hydrogen atoms in the other polyfunctional compounds present increases. The lactone may be reacted with initiators in two or more stages, as well as in one stage, and the polyfunctional initiator having three or more active hydrogen atoms need only be present in one stage of the process.

The term "lactone" as used herein is defined as one or more compounds each of formula:

(1) 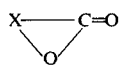

wherein X is a — $(CR_2)_n$ — group, wherein $n$ is an integer from 4 to 7 and wherein each of the 8 to 14 groups R is any group selected from hydrogen, methyl, ethyl, n-propyl, isopropyl, chlorine and bromine provided that the total number of carbon atoms in the — $(CR_2)_n$ — group does not exceed 12 and provided that there are no more than 2 halogen atoms in the — $(CR_2)_n$ — group. Desirably $n$ is 5 that is the lactone is an epsilon-caprolactone. Other preferred epsilon-caprolactones are a methyl epsilon-caprolactone, a mixture of isomeric methyl epsilon-caprolactones or a mixture of isomeric methyl epsilon-caprolactones with epsilon-caprolactone.

The polyfunctional compound may be a single compound or it may be more than one compound. The active hydrogen atoms may be hydrogen atoms attached to oxygen, sulphur or nitrogen. Preferably the active hydrogen atoms are attached to oxygen or nitrogen in an organic compound. The or each polyfunctional compound is preferably an alcohol, an amino-alcohol or an amine. Examples of suitable polyfunctional compounds include glycerol, trimethylol propane, trimethylol ethane, triethanolamine, diethanolamine, diethylene triamine, pentaerythritol sucrose and dipentaerythritol.

By "epoxide" we mean compounds having an oxirane or an oxetane ring or mixtures of such compounds.

Suitable classes of compounds include oxiranes and oxetanes substituted with alkyl or aryl groups, in particular chloro- substituted or alkoxy- or aryloxy-substituted alkyl or aryl groups.

Oxiranes and oxetanes substituted with alkyl or aryl groups which groups are substituted by ester groupings, being alkoxy- or aryloxy- carbonyl or alkyl or aryl-carbonyloxy groups, are also suitable. Oxiranes and oxetanes substituted with groups further substituted with active hydrogen atoms attached to nitrogen, sulphur or oxygen atoms may be used. The products obtained from them, will however, be branched, the active hydrogen atom reacting as a chain initiator.

Suitable epoxides include 1,2-epoxyethane, 1,2-epoxypropane, 1,2-epoxybutane, 1,2-epoxyoctane, 1,2-epoxydecane, 1,2-epoxydodecane, 1,2-epoxyeiconsane, 3,4-epoxyoctane, glycidyl ethers, for example allyl glycidyl ether, octyl glycidyl ether, butyl glycidyl ether, isooctyl glycidyl ether, phenyl glycidyl ether, cresyl glycidyl ether, glycidyl esters, for example glycidyl methyacrylate and glycidyl esters of fatty acids such as glycidyl laurate, glycidyl decanoate and glycidyl palmitate, glycidol, di-pentene monoxide, pinene monoxide, limonene monoxide, epoxidised fatty esters, for example octyl epoxystearate, styrene oxide, cyclohexane epoxide, epichlorhydrin, oxetane and 2,3-di (chloromethyl) oxetane.

The preferred epoxides are 1,2-epoxyethane and 1,2-epoxypropane.

Diepoxides may be used, if desired, in admixture with a monoepoxide. However, if too large a proportion of diepoxide is used the copolymer produced will not be linear but will be cross-linked. Suitable diepoxides include diglycidyl ether and diglycidyl ethers of diols, for example ethylene glycol diglycidyl ether and resorcinol diglycidyl ether, 1:2, 3:4-diepoxy butane and limonene diepoxide.

Preferably the proportion of lactone or lactone plus epoxide to polyfunctional compound in the adduct is arranged such that the number of active hydrogen atoms per molecule of lactone or lactone plus epoxide is from about 0.5 to about 3.

The adduct forming reaction is preferably carried out in the presence of a catalyst.

Where an epoxide is not involved the catalyst may for example be an organo-tin compound, an organo-titanium compound or a strong organic acid, preferably alkyl tin catalysts and alkyl titanate catalysts and particularly preferred catalysts are dibutyl tin dilaurate and tetrabutyl titanate. However if an epoxide is involved then the catalyst is preferably a Lewis acid and the catalyst is preferably present with the polyfunctional compound before addition of lactone and epoxide. Preferred Lewis acid catalysts include boron trifluoride, particularly in the form of a complex with an organic compound such as diethyl ether, stannic chloride and aluminium chloride. Many other chlorides are also suitable, for example, those of beryllium, zinc, cadmium, zirconium, antimony, bismuth and iron. It has also been found that it is sometimes advantageous to use, as a Lewis acid catalyst, boron trifluoride in combination with a proton acid. The proton acid is preferably an organic acid, particularly a strong organic acid, for example p-toluene sulphonic acid.

The adduct forming reaction is normally conducted at between 20°C and 220°C. Where an epoxide is absent it is preferably reacted at temperatures in the range of from 120°C to 200°C but where an epoxide is present the temperature is advantageously less than 100°C and preferably in the range of from 60°C to 90°C. The reaction is preferably continued until substantially all the lactone has reacted and is preferably carried out under inert atmosphere such as nitrogen. If an epoxide is used the lactone and epoxide are preferably added as a mixture at a sufficiently slow rate to ensure that the least reactive reagent does not build up to an excess during the reaction, and the adduct does not consist of a block copolymer. The least reactive reagent is normally the lactone. The % by weight of epoxide used is generally from 5 to 60%, preferably from 10 to 40% of the total.

If the adduct is not being used to make a foamed polyurethane it is advantageously water-free before it is reacted with the polyisocyanate otherwise undesirable bubbles of water vapour or carbon dioxide may be formed in the product polyurethane. The adduct may be dehydrated by suitable means such as stirring under vacuum and heating for about ½ hour. Generally, however, it has been found that the adducts of the present invention being less polar than poly-propylene oxide adducts and others are less hygroscopic and this is an advantage of the present invention, since the adducts may be used without dehydration.

The polyisocyanate is preferably a liquid polyisocyanate and it is preferably involatile since volatile polyisocyanates are often a safety hazard. The polyisocyanate is preferably a di-isocyanate. A particularly suitable polyisocyanate is 4,4' di-isocyanate diphenyl methane, especially crude di-isocyanate diphenyl methane such as that sold under the trade name Suprasec DN by Imperial Chemical Industries but other polyisocyanates such as tolylene di-isocyanates particularly dimerised tolylene di-isocyanates, di-isocyanate dicyclohexyl methane and hexamethylene di-isocyanate may be used.

The reaction between the adduct, polyisocyanate and blowing agent, if used, is advantageously carried out using the known one shot technique that is a prepolymer is advantageously not an intermediate. The foaming reaction is preferably carried out with a foam control agent, many of which known in the art are suitable, for example Silicone L5302, sold by Union Carbide or Silicocell 382 sold by I.C.I.

A isocyanurate may also be included to act as a fire retarding agent.

It is also desirable to include a catalyst in the reaction mixture. Suitable catalysts are organo-tin compounds and tertiary amines. Preferred catalysts include 1,2 diazobicyclo (2,2,2) octane, triethylamine, N,N dimethylethanolamine, N,N N',N' tetramethylethylenediamine, tetramethyl butane 1,3 diamine, dimethyl cyclohexylamine and dibutyl tin dilaurate.

The adduct is normally mixed with the blowing agent, if used, foam control agent, if used, and catalyst, if used, before it is mixed with the polyisocyanate because the reaction with the polyisocyanate is often rapid. The mixing is normally rapid and preferably a higher speed stirrer is used. To produce a non-foamed polyurethane the temperature at which the polyurethane forming reaction is carried out may be an elevated temperature of for example 140°C or at ambient temperatures followed by a post curing step of heating at about 100°C for about 1 hour. Such post curing step is not necessary if the reaction is carried out at 140°C. The time for which a polyurethane is held at an elevated curing temperature can be critical in determining the optimum combination of heat distortion temperatures and impact strengths. To produce a foamed polyurethane the mixture is normally mixed at ambient temperatures and injected into a mould held at a slightly elevated temperature, suitably at about 50°C, or it may be allowed to foam without constraint. The polyurethane forming reaction is preferably controlled so that it is not so fast that the product polyurethane ceases to flow before the mold is filled. It is found that a set foam is usually formed within two minutes of mixing the reactants together. The demould time, that is the time before the foam may be removed from the mould is normally from 1 to 30 minutes.

The present invention also provides rigid polyurethanes and rigid polyurethane foams whenever made by the process of the present invention.

Certain embodiments of the invention will now be described by way of example only.

EXAMPLE 1

This Example describes the preparation of lactone adducts only. In each run the following procedure was followed and the details are given in Table 1.

$\epsilon$-caprolactone L (in moles) and the or each polyfunctional compound or initiator I, were charged into a vessel heated under nitrogen to a temperature $\theta$ with stirring and dibutyl tin dilaurate in concentration C was added as a catalyst. The reaction was continued until the concentration of free caprolactone in the mixture fell to less than 0.5%, by weight of its initial weight, as measured by Gas Liquid Chromatography (G.L.C.). Concentrations below 0.5% were attained after T hours. The adduct was a liquid with a viscosity of $\eta$ cps when measured at 25°C by a Brookfield Viscometer. The adduct had an acid value of $y$ mg KOH per g and a hydroxyl value of $z$ mg KOH per g. The average molecular weight MW of the adduct was calculated in some instances.

EXAMPLE 2

This Example describes the preparation of a lactone adduct using a two stage process. $\epsilon$-caprolactone (682.7g) and diethylene glycol (317.3g) were charged to a 1-litre flask and heated under nitrogen with stirring to 180°C then dibutyl tin dilaurate (0.05g) was added. The materials were reacted for 8 hours under the conditions of Example 1 by which time the free caprolactone content had fallen to below 0.5%. The product was a pale yellow clear liquid with a viscosity of 144 cps at 25°C. It had an acid value of 0.9 mg. KOH per $g$ and a hydroxyl value of 337 mg. KOH per $g$. The product (822.4g) was melted with trimethylol propane (177.6g) and they were mixed to form homogeneous adduct. The hydroxyl value of this adduct was 555 mg KOH per $g$ and the MW was 310.

EXAMPLE 3

This Example describes the preparation of lactone-epoxide adducts. In each run the following procedure was followed and the details are given in Table 2.

The polyfunctional compound or initiator I was charged into a reaction vessel and maintained under an atmosphere of nitrogen. 0.06% by weight of a catalyst of boron trifluoride diethyl etherate (47% w/w $BF_3$) was added. The temperature was stabilised in a temperature range $\theta$ and a mixture of $\epsilon$-caprolactone and epoxide E was pumped in with stirring over a period of $T_1$ hours. The reaction was continued for a further $T_2$ hours when the free caprolactone content had fallen to 0.4% by weight as determined by G.L.C. The adduct was a liquid with an acid value of $y$ mg. KOH per $g$, a hydroxyl value of $z$ mg. KOH per $g$ and an average molecular weight of MW.

Table 1

| RUN NO. | I (moles used) | L | C % by weight | T hrs | $\theta$ °C | Properties | | | |
|---|---|---|---|---|---|---|---|---|---|
| | | | | | | $\eta$ | y | z | MW |
| 1 | T.M.P. (2.8) | 5.5 | 0.003 | 10 | 180 | 950 | 0.6 | 464 | — |
| 2 | pentaerythritol (1.7) | 6.8 | 0.003 | 10 | 180 | — | 1.0 | 382 | 590 |
| 3 | T.M.P. (6.5) | 10.0 | 0.003 | 14 | 170 | 1464 | 1.6 | 549 | 310 |
| 4 | glycerol (3.0) | 6.3 | 0.003 | 16 | 170 | — | 3.6 | 505 | 330 |
| 5 | diethanolamine (3.2) | 5.8 | 0.001 | 8 | 170 | 2744 | 9.5 | 506.1 | — |
| 6 | triethanolamine (3.2 moles) | 4.5 | — | 8 | 170 | 690 | 3.3 | 554 | 310 |
| 7 | T.M.P. (2.6) diethanolamine (0.7) | 5.1 | 0.003 | 16 | 180 | 1780 | 4.7 | 537 | — |
| 8 | glycerol (3.6) | 5.8 | 0.003 | 16 | 180 | 696 | 3.72 | 618 | 275 |
| 9 | T.M.P. (3.6) diethylene glycol (4.5) | 9.0 | 0.002 | 6 | 180 | 340 | 1.1 | 561 | — |
| 10 | ethane diol (5.0) T.M.P. (5.2) | 10.3 | 0.002 | 6 | 180 | 430 | 1.0 | 660 | — |
| 11 | T.M.P. (5.0) | 10.0 | 0.002 | 6 | 180 | 1125 | 1.2 | 374 | 450 |

T.M.P. = trimethylol propane.

Table 2

| RUN NO. | I (moles used) | E (moles used) | Lactone used (moles) | $T_1$ hrs | $T_2$ hrs | $\theta$ °C | Properties | | |
|---|---|---|---|---|---|---|---|---|---|
| | | | | | | | y | z | MW |
| 1 | T.M.P. (3.0) | E.O. (4.0) | 4.5 | 3¼ | 2 | 85–95 | 2.0 | 481 | 350 |
| 2 | T.M.P. (6.0) | E.O. (5.0) | 7.4 | 4¼ | ¾ | 90–5 | 3.2 | 540 | 310 |
| 3 | T.M.P. (5.0) | E.O. (6.0) | 9.3 | 4½ | 1¼ | 65–95 | 2.1 | 430 | 390 |
| 4 | T.M.P. (5.0) | P.O. (4.5) | 9.3 | 4½ | 2 | 83–90 | 2.4 | 424 | 394 |
| 5 | T.M.P. (5.0) | E.C.H. (2.8) | 9.3 | 4 | 1¼ | 90 | 2.4 | 426 | 392 |
| 6 | T.M.P. (5.0) | E.P. (14) | 7.0 | 6 | 2 | 95–100 | 2.4 | 434 | 386 |

Table 2 —Continued

| RUN NO. | I (moles used) | E (moles used) | Lactone used (moles) | $T_1$ hrs | $T_2$ hrs | $\theta$ °C | Properties y | z | MW |
|---|---|---|---|---|---|---|---|---|---|
| 7 | T.M.P. (3.0) | E.O. (3.0) | 4.5 | 3¾ | 2 | 85–95 | 20 | 481 | — |

T.M.P. = trimethylol propane
E.O. = ethylene oxide
P.O. = propylene oxide
E.C.H. = epichlorohydrin

EXAMPLE 4

The adducts from Example 1 Runs 1 and 2 and 9 to 11, Example 2 and Example 3 Runs 1 to 6 were each converted to a solid urethane plastic by the following procedure. For comparative purposes an adduct based on propylene oxide and glycerol sold as DALTOCAST 3 by I.C.I. was also converted by the same procedure to a solid urethane plastic. The comparative sample had an acid value of 0.4 mg KOH per g and a hydroxyl value of 485 mg KOH per g.

The adduct was dried by heating at 100° to 110°C under a pressure of 2 mm of mercury for between ½ to 5 hours. It was then rapidly mixed using a high speed stirrer with polyisocyanate, sold under the name SUPRASEC DN, which had been dried at 2 mm Hg pressure for ½ to 5 hours.

In the case of Example 1 Runs 1 to 3, Example 2 and Example 3 Runs 1 to 6 the mixture was then poured into a mould where after the mixture had cured and reacted sufficiently that it could be removed it was removed and post-cured at 100°C for 1 hour.

In the case of Example 1 Runs 9 to 11 the mixture was poured into a mould maintained at 140°C, whose internal dimensions were 34 cm × 28 cm × 0.75 cm. The cured slabs were removed after 5 minutes. No post-curing was done.

The quantities of material used are given in Table 3.

Table 3

| RUN | Adduct from | Weight of Adduct (g) | Weight of Suprasec DN (g) |
|---|---|---|---|
| 1 | Ex. 1 Run 1 | 121.0 | 156.5 |
| 2 | Ex. 1 Run 2 | 146.7 | 156.5 |
| 3 | Ex. 1 Run 9 | 359 | 532 |
| 4 | Ex. 1 Run 10 | 325 | 566 |
| 5 | Ex. 1 Run 11 | 434 | 456 |
| 6 | Ex. 2 | 112.2 | 156.5 |
| 7 | Ex. 3 Run 1 | 117 | 156 |
| 8 | Ex. 3 Run 2 | 104 | 156 |
| 9 | Ex. 3 Run 3 | 131 | 156 |
| 10 | Ex. 3 Run 4 | 132 | 156 |
| 11 | Ex. 3 Run 5 | 132 | 156 |
| 12 | Ex. 3 Run 6 | 130.5 | 156 |
| 13 | DALTOCAST 3 | 119 | 156 |

EXAMPLE 5

A cured solid urethane plastic was prepared from the adduct of Example 1 Run 1 using the same procedure as in Example 4 except that the adduct was not dried. This adduct was found to contain 0.045% by weight of water as determined by the Karl Fischer method.

The cured slab was found to be free of bubbles.

EXAMPLE 6

This is a comparative example in which a cured solid urethane plastic was prepared from DALTOCAST 3 as in Example 5. The sample of DALTOCAST 3 was found to contain 0.066% by weight of water as determined by the Karl Fischer method and gave a cured slab full of bubbles. This comparison shows that the adducts of the present invention have better resistance to the uptake of water.

EXAMPLE 7

The solid urethane plastics prepared according to Example 4 were tested using the following methods.

a. the flexural modulus was measured according to a modified BS 2782 part 3 method 304 C. The modification consisting of using a rate of strain of 5 cm per minute and a sample of dimensions 1.27 cm × 0.32 cm × 11.5 cm. Three point loading was used.

b. the impact strength was measured using a tubular falling weight impact tester as described in BS 1391, and c. the heat distortion temperature was measured according to BS 2782 Part 1 Method 102 g.

The results of the tests are given in Table 4.

Table 4

| PRODUCT FROM RUN NO. | Flexural Modulus Kg cm$^{-2}$ | Heat Distortion Temperature °C | Impact Strength cm kgs. |
|---|---|---|---|
| 1 | 23,000 | 79 | 6 |
| 2 | 29,000 | 79 | 11 |
| 3 | — | 85.5 | >176 |
| 4 | — | 103.5 | 167 |
| 5 | — | 66 | >176 |
| 6 | 27,000 | 63.5 | 16 |
| 7 | 27,000 | 96.5 | 22 |
| 8 | 26,000 | 86 | 14 |
| 9 | 23,000 | 72 | 27 |
| 10 | 24,000 | 75 | 53 |
| 11 | 27,000 | 73 | 24 |
| 12 | 24,000 | 74.5 | 30 |
| 13 | 27,200 | 83 | 8 |

The comparative urethane (product from Example 4 Run 13) shows very poor impact strength in comparison with the urethanes produced by the present invention.

EXAMPLE 8

The adducts from Example 1 Runs 3 to 8 and Example 3 Run 7 were each converted to a polyurethane foam by the following procedure and the type and quantity of the reagents used are given in Table 5.

The catalyst, if used, and foam control agent, were dissolved in the adduct and then the blowing agent was dissolved in the mixture. The polyisocyanate SUPRASEC DN was stirred in with a high speed stirrer. The mixture was cast into a 40 × 10.2 × 1.3 cm mould at 50°C and the lip clamped on. The mould was opened after 10 minutes and the slab of rigid polyurethane foam was removed. The foam had a fine uniform cell structure.

Table 5

| RUN NO. | ADDUCT FROM (g) | CATALYST (g) | FOAM CONTROL AGENT (g) | BLOWING AGENT (g) | SUPRASEC DN (g) |
|---|---|---|---|---|---|
| 1 | Ex. 1 Run 3 (40.2) | D.Z.O. (0.42) | L5302 (0.5) | CCl₃F (10) | 59.8 |
| 2 | Ex. 1 Run 4 (42.9) | D.Z.O. (0.42) | L5302 0.5) | CCl₃F (10) | 57.1 |
| 3 | Ex. 1 Run 5 (40.5) | — | L5302 (0.5) | CCl₃F (10) | 59.5 |
| 4 | Ex. 1 Run 6 (40.5) | D.Z.O. (0.40) | L5302 (0.5) | CCl₃F (10) | 59.5 |
| 5 | Ex. 1 Run 7 (114) | D.Z.O. (1.3) | L5302 (1.42) | CCl₃F (10) | 168.4 |
| 6 | Ex. 1 Run 8 (108.5) | D.Z.O. (1.42) | L5302 (1.42) | CCl₃F (11) | 176 |
| 7 | Ex. 3 Run 7 (126.1) | D.Z.O. (0.7) | L5302 (1.5) | CCl₃F (12) | 154.9 |
| 8 | Ex. 1 Run 3 (110) | T.M.B.A. (1.0) | L5302 (1.5) | Water (0.85) | 176 |
| 9 | Ex. 1 Run 3 (70) | Dabco 33 LV (0.75) Dabco WT (0.75) | 382 (1.5) | CCl₃F (8) | 114 |

D.Z.O. = 1,2 diazobicyclo (222) octane
T.M.B.A. = tetramethyl butane 1,3 diamine
L5302 = Silicone L5302
382 = Silicocell 382

EXAMPLE 9

Foams made according to Example 8 were tested as in Example 7 with an additional measure of density and the results are given in Table 6.

Table 6

| Foam produced from Run No. | Density g/cm | Flexural Modulus Kg/cm² | Heat Distortion Temperature °C | Impact Strength cm kg. |
|---|---|---|---|---|
| 1 | 0.48 | 4110 | 76 | 176 |
| 2 | 0.45 | 4000 | 56 | 176 |
| 3 | 0.47 | 4000 | 74 | 110 – 176 |
| 4 | 0.47 | 3400 | 67 | 110 – 176 |
| 5 | 0.47 | 4000 | 74 | 110 – 176 |
| 6 | 0.46 | 3630 | 78 | 110 – 176 |
| 7 | 0.47 | 5300 | 65 | 143 – 176 |
| 8 | 0.47 | — | 78 | 71 |
| 9 | 0.31 | — | 64 | 88 |

We claim:

1. A process for the production of a solid rigid non-foamed polyurethane of improved impact strength, heat distortion and flexural modulus properties which comprises:
   a. reacting an ε-caprolactone with a triol or pentaerythritol to produce a liquid adduct or molecular weight of from 200 to 600 and a viscosity of less than 6000 centipoise at 25°C and
   b. reacting the adduct with a liquid di-isocyanate in the absence of a blowing agent at elevated temperatures sufficient to provide said solid rigid non-foamed polyurethane of improved impact strength, heat distortion and flexural modulus properties.

2. A process as claimed in claim 1 wherein a catalyst selected from the group consisting of alkyl-tin compounds, alkyltitanate compounds and strong organic acids is used in the preparation of the adduct.

3. A process as claimed in claim 1 wherein the adduct is an adduct of the lactone, the triol or pentaerythritol and at least one epoxide, being a compound having an oxirane or an oxetane ring structure.

4. A process as claimed in claim 3 wherein the adduct has an average molecular weight of between 200 and 450.

5. A process as claimed in claim 3 wherein the adduct is formed by adding a mixture of epoxide and lactone to the triol or pentaerythritol at a sufficiently slow rate to ensure that the least reactive reagent does not build up to an excess during the reaction.

6. A process as claimed in claim 3 wherein the percentage by weight of epoxide in the adduct is from 5 to 60%.

7. A process as claimed in claim 3 wherein the epoxide is selected from the group consisting of 1,2 epoxy propane, 1,2 epoxyethane and epichlorohydrin.

8. A process as claimed in claim 1 wherein the liquid adduct is formed by reacting an ε-caprolactone, said triol or pentaerythritol and a compound having two active hydrogen atoms per molecule.

9. A process as claimed in claim 8 wherein the compound having two active hydrogen atoms per molecule is selected from the group consisting of diethylene glycol, ethylene glycol, ethane 1,4 diol, propylene glycol, butane 1,4 diol and hexane diols.

10. A process as claimed in claim 1 wherein the ε-caprolactone is reacted with a triol.

11. A process as claimed in claim 1 wherein the ratio of active hydrogen atoms in the triol or pentaerythritol to lactone molecules or to the total number of lactone and epoxide molecules is from 0.5 to 3.

12. A process as claimed in claim 3 wherein the ratio of active hydrogen atoms in the triol or pentaerythritol to lactone molecules or to the total number of lactone and epoxide molecules is from 0.5 to 3.

* * * * *